Patented Feb. 2, 1943

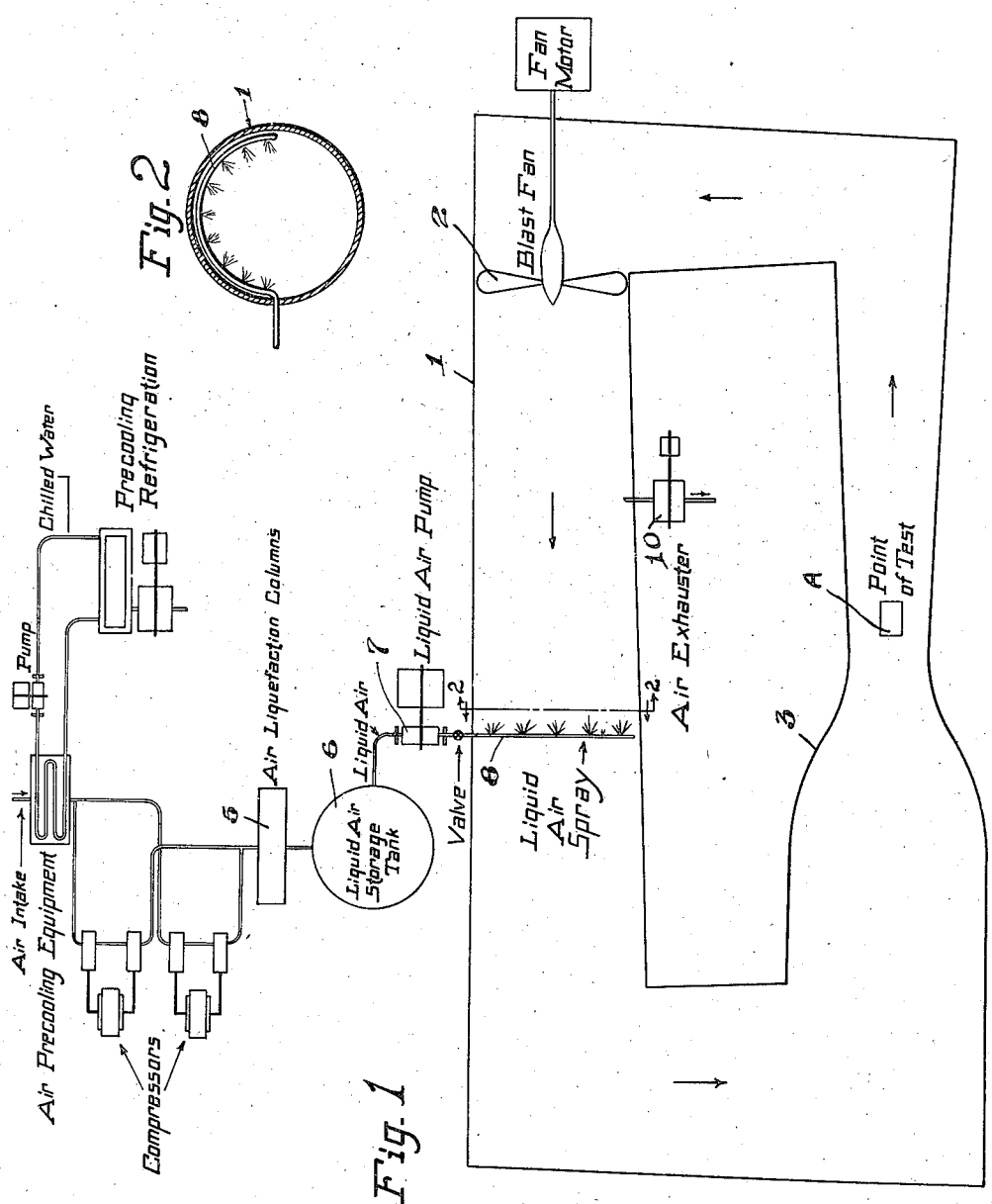

2,309,938

UNITED STATES PATENT OFFICE 2,309,938

COOLING SYSTEM FOR WIND TUNNELS OR SIMILAR ENCLOSURES

Paul Diserens, Summit, and Horace Edmund Karig, Chatham, N. J., and Michael E. O'Connell, New York, N. Y., assignors to Worthington Pump and Machinery Corporation, Harrison, N. J., a corporation of Delaware Application December 4, 1941, Serial No. 421,630

18 Claims. (Cl. 62—178)

This invention relates to air cooling or conditioning, and more particularly to a method and apparatus for cooling wind tunnels or similar enclosures such as are employed in testing aeroplanes, parts thereof, and equipment used thereon.

In testing parts of aeroplanes as well as equipment employed on or in the aeroplane, for determining the reaction of such parts or equipment under various flying conditions, it is necessary to simulate such flying conditions. It is the practice to provide what is commonly known as a "wind tunnel" for this purpose. Such wind tunnels are enclosures in which various air velocities are set up, by means of a fan or fans, such as correspond to the speed of the plane.

Heretofore it has been the practice to provide temperature control or chilling of the wind tunnels by the use of approved types of refrigerating systems, embodying the usual cooling or evaporating coils for extracting the heat from the wind tunnel. However, with the sizes of wind tunnels now coming into use, it is impractical, and practically impossible, to cool the tunnels to sufficiently low temperatures as to simulate temperatures encountered at high altitudes, such as those encountered by "stratosphere" planes and still embody in the refrigerating system the flexibility desired and necessary to meet the required conditions of such a testing wind tunnel.

It is an object of the present invention to provide a method and apparatus for cooling such wind tunnels or similar enclosures which is practical, reliable, and sufficiently flexible to permit accurate regulation of the temperature in the enclosure through a wide range which will maintain air temperature and pressure corresponding to those met at various altitudes and which, in offering no wind resistance, will enable full utilization of the air velocity set up by the fan.

Testing wind tunnels of this type are used intermittently. Sometimes they operate for relatively long periods without use of the refrigerating apparatus, and at certain times of use require relative large amounts of refrigeration to produce the desired temperature within the tunnel, thus complicating the problem of size, flexibility and cost of the refrigeration equipment.

It is an object of the present invention to provide a cooling system for wind tunnels or similar enclosures which provides for storage of the refrigerating medium, thereby permitting the use of refrigerating machinery and apparatus of smaller capacity and less cost, which may operate to store the refrigerating medium independently of the time or quantity of refrigeration required, and still have available for instant use sufficient refrigerant to meet any refrigeration demands or requirements within the enclosure.

With these and other objects in view, as may appear from the accompanying specification, the invention consists of various features of construction and combination of parts, which will be first described in connection with the accompanying drawing, showing a cooling system for wind tunnels or similar enclosures of the preferred form embodying the invention, and the features forming the invention will be specifically pointed out in the claims.

In the drawing:

Figure 1 is a diagrammatic view showing a modern wind tunnel together with the various mechanisms employed in cooling its interior.

Figure 2 is a cross-section taken on the line 2—2 of Figure 1.

Referring more particularly to the drawing, the wind tunnel, generically indicated by the numeral 1, is provided with any approved type of blast fan 2, placed therein for creating air velocity within the tunnel corresponding to the speeds of an aeroplane on which parts or equipment to be tested is carried, and as shown at 3, the tunnel is provided with a velocity increasing reduced portion at the outlet of which, such as the point A, the part or equipment to be tested is placed.

The temperature encountered by aeroplanes at various altitudes varies, of course, and to provide complete and accurate tests of the equipment it is necessary that the air pressure and temperature at the point A be substantially the same as those encountered at various predetermined altitudes. At very high altitudes, such as in the stratosphere, temperatures as low as −48° F. are encountered, and the present invention comprises a method and apparatus for providing a wide range of temperatures in the wind tunnel together with the corresponding pressures.

The usual practice in cooling wind tunnels has been to employ approved types of refrigerating systems embodying cooling or evaporating coils, placed within the tunnel for extracting the heat from the air within the tunnel. However such coils offer considerable wind resistance, which is objectionable because of the increased power required to maintain the desired air velocity in the tunnel. Moreover, in wind tunnels of the large sizes coming into use it is practically impossible to provide refrigerating systems of this type of sufficient flexibility to permit the range of temperatures required. Further, with the very large coils required for such cooling, it is practically impossible to provide uniformity of temperature.

The present invention comprehends the utilization of liquid air as the cooling or refrigerating medium, and a conventional approved type of liquid air producing apparatus or equipment is employed for making the liquid air. The liquid air passes from the air liquefaction columns 5 of the liquid air producing equipment to a storage tank 6. A pump 7, of any approved type, the discharge capacity of which may be regulated by its speed of operation, is connected to the storage tank 6 and withdraws the liquid air therefrom, delivering it to a spray mechanism 8 placed within the tunnel 1 at an advantageous point between the fan 2 and the testing point A. The spray mechanism 8 extends across the upper part of the tunnel 1 and is shaped to conform to the configuration of the inner wall of the tunnel. The liquid air is sprayed downwardly in the tunnel across the path of flow of the wind or air current set up by the fan 2. Since the liquid air is heavy, it will fall through the space within the tunnel in substantially a shower curtain, and since in an enclosure the warmer air has a tendency to rise to the top, this action, together with the heavier characteristic of the liquid air, will result in a uniform cooling cross-sectionally of the tunnel 1. The temperature within the tunnel can be accurately controlled over a wide range by regulating the quantity of liquid air sprayed into the tunnel, through control of the speed of operation of the pump 7.

While the quantity of liquid air sprayed into the tunnel 1 may be thus controlled or regulated by the speed of operation of the liquid air pump, as just described, it is to be understood that other suitable means may be employed for controlling the quantity of liquid air sprayed into the tunnel, such as by an ordinary valve as shown at 11, or an approved type of temperature controlled valve, or by control of the operation of the liquid air pump 7 by means operated from temperature actuated control means which may be located within the tunnel at the point A, or any other suitable point.

Liquid air may be stored in practically any quantity, and by providing the storage tank 6 a liquid air producing apparatus of smaller capacity than the quantity required to meet the various temperature conditions desired within the tunnel or enclosure may be employed, thus not only saving in initial cost of the apparatus but also providing a savings in power consumption of the apparatus. The storing of the liquid air in the storage tank also provides the refrigerating medium in instantly available quantities to provide cooling within the enclosure through the entire range of temperatures desired and permits a maximum degree of flexibility in temperature control within the enclosure without any abnormal strains on the refrigerating machinery and with simple, inexpensive control mechanism.

An air exhauster 10, such as a conventional type of compressor, has its suction connected to the interior of the tunnel 1 at any desired point beyond the spray mechanism 6. This air exhauster removes air from the tunnel, preferably between the discharge of the fan 2 and the point of introduction of the liquid air, and maintains the pressure within the tunnel to correspond to the pressure at the altitude for which the tests are to be made. Thus a comparatively simple, flexible and practical method has been provided for maintaining the temperature and pressure within a testing wind tunnel to correspond to the temperature and pressure encountered by aeroplanes at practically any predetermined altitude.

While in the foregoing specification and in the drawings the method of cooling or refrigeration is described and shown as applied to enclosures known commercially as "wind tunnels," it is to be understood that the method of cooling or refrigeration may be employed with other types of enclosures with equal efficiency and convenience and without departing from the spirit of the present invention.

It will be understood that the invention is not to be limited to the specific construction or arrangement of parts shown, but that they may be widely modified within the invention defined by the claims.

What is claimed is:

1. The method of cooling an enclosure which consists in creating an air current in the enclosure and spraying liquid air into said enclosure in the air current in a direction transversely of the path of the air current.

2. The method of cooling an enclosure which consists in creating an air current in the enclosure and spraying liquid air into said enclosure into the air current in a direction transversely of the path of the air current, and regulating the temperature in the enclosure by regulating the quantity of liquid air sprayed thereinto.

3. The method of cooling an enclosure which consists in creating an air current in the enclosure, spraying liquid air downwardly into the enclosure, and withdrawing air from the enclosure to maintain a predetermined pressure in the enclosure.

4. The method of cooling an enclosure which consists in spraying liquid air into the enclosure, withdrawing air from the enclosure to maintain a predetermined pressure in the enclosure, and regulating the temperature in the enclosure by regulating the quantity of liquid air sprayed thereinto.

5. The method of cooling an enclosure which consists in producing liquid air, storing the produced liquid air, spraying the stored liquid air into the enclosure, and regulating the temperature within the enclosure by regulating the quantity of liquid air sprayed thereinto.

6. The method of cooling an enclosure which consists in producing liquid air, storing the produced liquid air, creating an air current in the enclosure, spraying stored liquid air into the air current in the enclosure, withdrawing air from the enclosure to maintain a predetermined pressure in the enclosure, and regulating the temperature in the enclosure by regulating the quantity of liquid air sprayed thereinto.

7. The method of cooling an enclosure which consists in producing liquid air at a rate less than the rate at which it is used in providing the desired cooling temperature in the enclosure, storing the liquid air as it is produced to provide a stored supply, creating an air current in the enclosure, spraying the liquid air from the stored supply into the enclosure in said air current, and regulating the temperature within the enclosure by regulating the quantity of liquid air sprayed thereinto.

8. In combination with an enclosure, means for creating an air current therethrough, a source of supply of liquid air, spray means in said enclosure and connected to said source of supply of liquid air for spraying liquid air into the enclosure in the path of the air current therein, means for regulating the quantity of liquid air sprayed into the enclosure to regulate the temperature produced within the enclosure, and means for withdrawing air from the enclosure for regulating the pressure therein.

9. In combination with an enclosure and means for creating an air current therethrough, a source of supply of liquid air, spray means in said enclosure and connected to said source of supply of liquid air for spraying liquid air into the enclosure in the path of the air current therein, means for regulating the quantity of liquid air sprayed into the enclosure to regulate the temperature produced within the enclosure, and means for withdrawing air from the enclosure for regulating the pressure therein, said spray means constructed and arranged to spray the liquid air downwardly into the enclosure from the upper part thereof in a direction transversely of the path of the air current.

10. In combination with a wind tunnel, means for creating an air current therein, said tunnel provided with a point for placement therein of equipment to be tested, a supply source of liquid air, spray means in said tunnel between the air current creating means and said placement point, said spray means connected to said liquid air supply source for spraying liquid air into the tunnel.

11. In combination with a wind tunnel; means for creating an air current therein, said tunnel provided with a point for placement therein of equipment to be tested; a liquid air storage tank; a pump for withdrawing liquid air from said tank, and spray means in said tunnel and connected to said pump for spraying liquid air into the tunnel; said spray means being located between the air current creating means and said placement point.

12. In combination with a wind tunnel and means for creating an air current therein, said tunnel provided with a point for placement therein of equipment to be tested, a liquid air storage tank, a pump for withdrawing liquid air from said tank, spray means in said tunnel and connected to said pump for spraying liquid air into the tunnel, said spray means being located between the source of air current and said placement point, and an air exhauster connected to the tunnel between the placement point and the point of introduction of liquid air for withdrawing air from the tunnel to maintain predetermined pressures in the tunnel.

13. In combination with an enclosure and means for creating an air current therethrough, liquid air producing means, a storage tank for receiving liquid air from said producing means, spray means in said enclosure and connected to said storage tank for spraying liquid air into the enclosure in the path of the air current therein, and means for regulating the quantity of liquid air sprayed into the enclosure to regulate the temperature produced in the enclosure.

14. The combination with an enclosure, of means for creating an air current therethrough, a source of supply of liquid air, spray means in said enclosure and connected to said source of supply of liquid air for spraying liquid air into the enclosure in the path of the air current therein, and an air exhauster for withdrawing air from the enclosure for regulating the pressure therein.

15. In combination with a wind tunnel, means for creating an air current in the tunnel, said tunnel provided with a point for placement therein of equipment to be tested, a supply source for liquid air, spray means in said tunnel between the air current creating means and said placement point, said spray means connected to said liquid air supply source for spraying liquid air into the tunnel, and means connected to the interior of the tunnel between the air current creating means and said spray means for withdrawing air from the tunnel.

16. In combination with a wind tunnel, means for creating an air current therein, said tunnel provided with a point for placement therein of equipment to be tested, a supply source for liquid air, spray means in said tunnel between the air current creating means and said placement point, said spray means connected to said liquid air supply source for spraying liquid air into the tunnel, an air exhauster connected to the interior of the tunnel between the air current creating means and said point for placement of equipment to be tested for withdrawing air from the enclosure to regulate the pressure therein.

17. In combination with an enclosure; means for creating an air current therethrough, liquid air producing means, said liquid air producing means being of less capacity per hour than the per hour requirement of liquid air to produce a predetermined cooling temperature in the enclosure, a storage tank having a storing capacity sufficient to store liquid air in sufficient quantity to provide the predetermined cooling temperatures in the enclosure for a predetermined time interval, said tank receiving liquid air from said producing means, spray means in said enclosure and connected to said storage tank for spraying liquid air into the enclosure in the path of the air current therein.

18. The method of cooling an enclosure which consists in producing liquid air at a rate less than the rate at which it is used in providing the desired cooling temperature in the enclosure, storing the liquid air as it is produced to provide a stored supply, creating an air current in the enclosure, and spraying liquid air from the stored supply into the air current within the enclosure.

PAUL DISERENS.
HORACE EDMUND KARIG.
MICHAEL E. O'CONNELL.